United States Patent
Chao et al.

(10) Patent No.: US 7,094,009 B2
(45) Date of Patent: Aug. 22, 2006

(54) GEAR-FORMING CUTTER

(75) Inventors: Sheng-Jui Chao, Taichung (TW);
Tsu-Meng Lee, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/114,393

(22) Filed: Apr. 25, 2005

(65) Prior Publication Data
US 2006/0062643 A1    Mar. 23, 2006

(30) Foreign Application Priority Data
Sep. 23, 2004    (TW)    .............................. 93128841 A

(51) Int. Cl.
*B23F 21/12*    (2006.01)
(52) U.S. Cl. .......................................... 409/50; 407/29
(58) Field of Classification Search .................. 409/50, 409/10, 38–39, 52–53; 407/20–22, 25–29, 407/53–54
See application file for complete search history.

(56) References Cited

U.S. PATENT DOCUMENTS 1,429,614 A * 9/1922 Muller ......................... 407/29
2,682,099 A * 6/1954 Wildhaber .................... 407/29
3,857,305 A * 12/1974 Lichtman ..................... 76/115
4,338,050 A * 7/1982 Ozer et al. .................. 408/1 R

FOREIGN PATENT DOCUMENTS

DE        3209879 A  *  9/1983

OTHER PUBLICATIONS

Mabie et al., Mechanisms and Dynamics of Machinery, 4th ed., 1987, John Wiley & Sons, p. 139.*

* cited by examiner

*Primary Examiner*—Erica Cadugan
(74) *Attorney, Agent, or Firm*—David T. Millers

(57) ABSTRACT

A gear-forming cutter for forming a gear tooth on a non-metallic blank includes a spindle and a blade portion. The blade portion extends from the spindle along an axis of the spindle, and includes a blade surface and a surrounding surface. The blade surface has front and rear sides, and opposite first and second lateral sides. The surrounding surface is disposed around the axis, and extends from the first lateral side to the second lateral side. Any point of the first lateral side is spaced apart from the axis by a first radial distance. Any point of the second lateral side is spaced apart from the axis by a second radial distance smaller than the corresponding first radial distance. The first radial distance corresponding to the rear side is larger than that corresponding to the front side.

5 Claims, 9 Drawing Sheets

GEAR-FORMING CUTTER

CROSS-REFERENCE TO RELATED APPLICATION

This application claims priority of Taiwanese Application No. 093128841, filed on Sep. 23, 2004.

BACKGROUND OF THE INVENTION

1. Field of the Invention

This invention relates to a cutting instrument, and more particularly to a gear-forming cutter that machines a non-metallic workpiece to form gear teeth on the same.

2. Description of the Related Art

Common gear-forming methods include a rolling process (see FIG. 1) and a milling process (see FIG. 2). Referring to FIG. 1, in the rolling process, a tooth-rolling cutter 2 is rotated to machine a metallic blank 1. The tooth-rolling cutter 2 rotates about a rotating axis perpendicular to that of the metallic blank 1. When the metallic blank 1 and the tooth-rolling cutter 2 rotate at an appropriate speed ratio, the tooth-rolling cutter 2 is brought into press contact with the metallic blank 1 to form a plurality of gear teeth on the same. Referring to FIG. 2, in the milling process, a milling cutter 3 is disposed parallel to a metallic blank 1 to machine the same. When the metallic blank 1 and the milling cutter 3 rotate in opposite directions, a plurality of gear teeth are formed on the metallic blank 1.

Although the tooth-rolling cutter 2 and the milling cutter 3 can form the gear teeth on the metallic blank 1, these machining devices are bulky. Therefore, the tooth-rolling cutter 2 and the milling cutter 3 are not suitable for machining non-metallic precision instruments, e.g., a barrel 4 (see FIG. 3) of a zoom lens of a camera. Referring to FIG. 3, in order to enable the barrel 4 to be driven, the barrel 4 includes a toothed driving ring 400 that has an annular outer surface, which is formed with axial teeth 401 and helical teeth 402. Because of the small size of the barrel 4 and the inclusion of both the axial teeth 401 and the helical teeth 402 on the driving ring 400, the driving ring 400 cannot be formed by means of the tooth-rolling cutter 2 and the milling cutter 3.

SUMMARY OF THE INVENTION

The object of this invention is to provide a compact gear-forming cutter that can form gear teeth on a non-metallic precision instrument.

According to this invention, a gear-forming cutter for forming a gear tooth on a non-metallic blank includes a spindle and a blade portion. The blade portion extends from an end surface of the spindle along an axis of the spindle, and includes a blade surface and a surrounding surface. The blade surface has front and rear sides, and opposite first and second lateral sides. The first lateral side has a shape corresponding to the contour of the flanks of the gear tooth. The surrounding surface is disposed around the axis, and extends from the first lateral side to the second lateral side. Any point of the first lateral side is spaced apart from the axis by a first radial distance. Any point of the second lateral side is spaced apart from the axis by a second radial distance smaller than the corresponding first radial distance. The first radial distance corresponding to the rear side is larger than that corresponding to the front side.

As such, the gear-forming cutter is suitable for forming gear teeth on a non-metallic precision instrument. When the blank is cut, chips can be removed through spaces defined by the blade portion and the end surface of the spindle.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
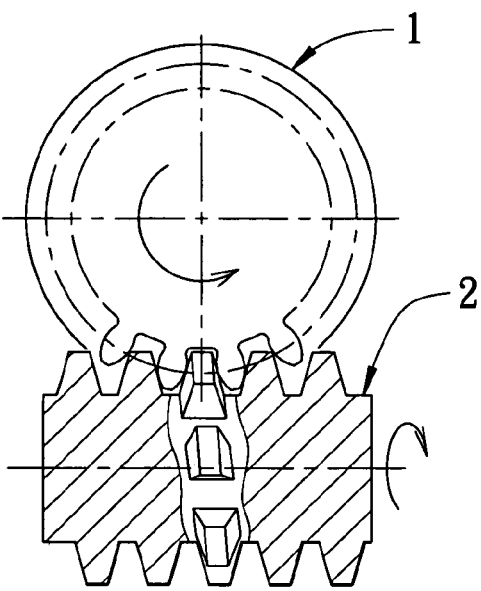
FIG. 1 illustrates how gear teeth are formed on a metallic blank by means of a conventional gear-forming cutter during a rolling process.

Before the present invention is described in greater detail in connection with the preferred embodiments, it should be noted that similar elements and structures are designated by like reference numerals throughout the entire disclosure.

Figure 4:
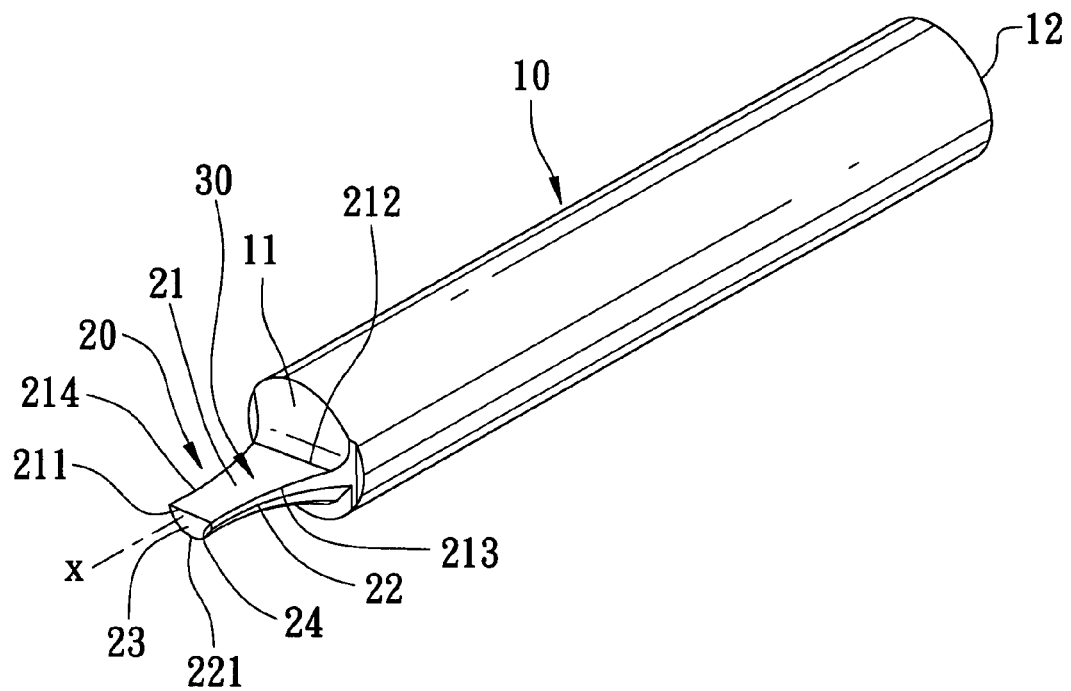
FIG. 4 is a perspective view of the first preferred embodiment of a gear-forming cutter according to this invention.
Figure 5:
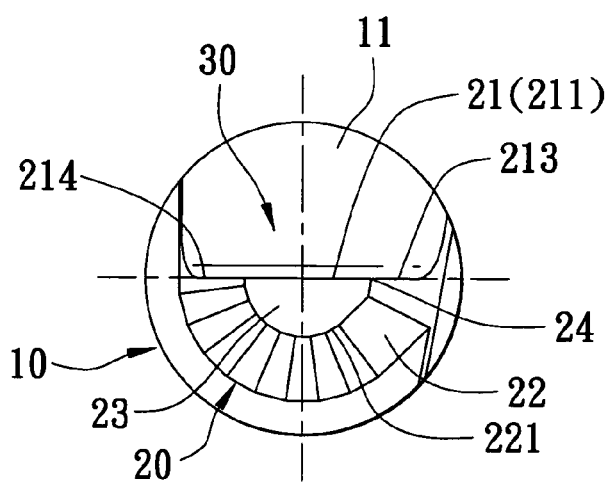
FIG. 5 is a front view of the first preferred embodiment.
Figure 6:
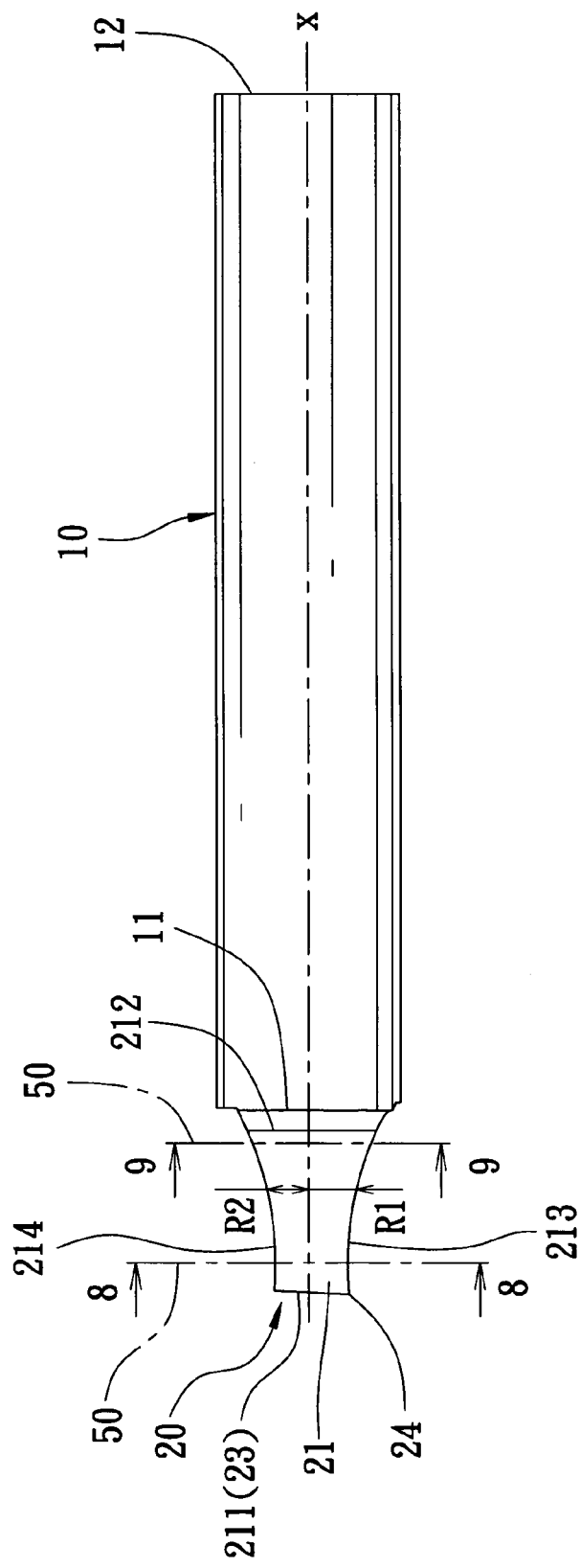
FIG. 6 is a top view of the first preferred embodiment.

FIGS. 4, 5, and 6 are respectively a perspective view, a front view and a top view of the first preferred embodiment of a gear-forming cutter according to this invention. Referring to FIGS. 4, 5, 6, 10, and 11, the gear-forming cutter is provided for machining a gear blank 100 so as to form a plurality of gear teeth 110 thereon. Each of the gear teeth 110 includes two flanks 111 each having an involute contour. The gear blank 100 is configured as a barrel of a zoom lens that is a part of a camera. The gear-forming cutter includes a spindle 10 and a blade portion 20.

The spindle 10 has a pair of first and second end surfaces 11, 12 that are opposite to each other along an axis (X) of the spindle 10. The spindle 10 is disposed on a movable main shaft 200 (see FIG. 10).

The blade portion 20 extends from the first end surface 11 of the spindle 10 along the axis (X), and includes a blade surface 21, a surrounding surface 22 and a front end surface 23. The blade surface 21 has a front side 211, a rear side 212 opposite to the front side 211 and located on the first end surface 11 of the spindle 10, and a pair of opposite first and second lateral sides 213, 214 interconnecting the front and rear sides 211, 212. The first lateral side 213 is shaped as an involute line corresponding to the contour of the flanks 111 of the gear teeth 110. The front side 211 of the blade surface 21 is inclined with respect to reference planes 50 (see FIGS.

Figure 7:
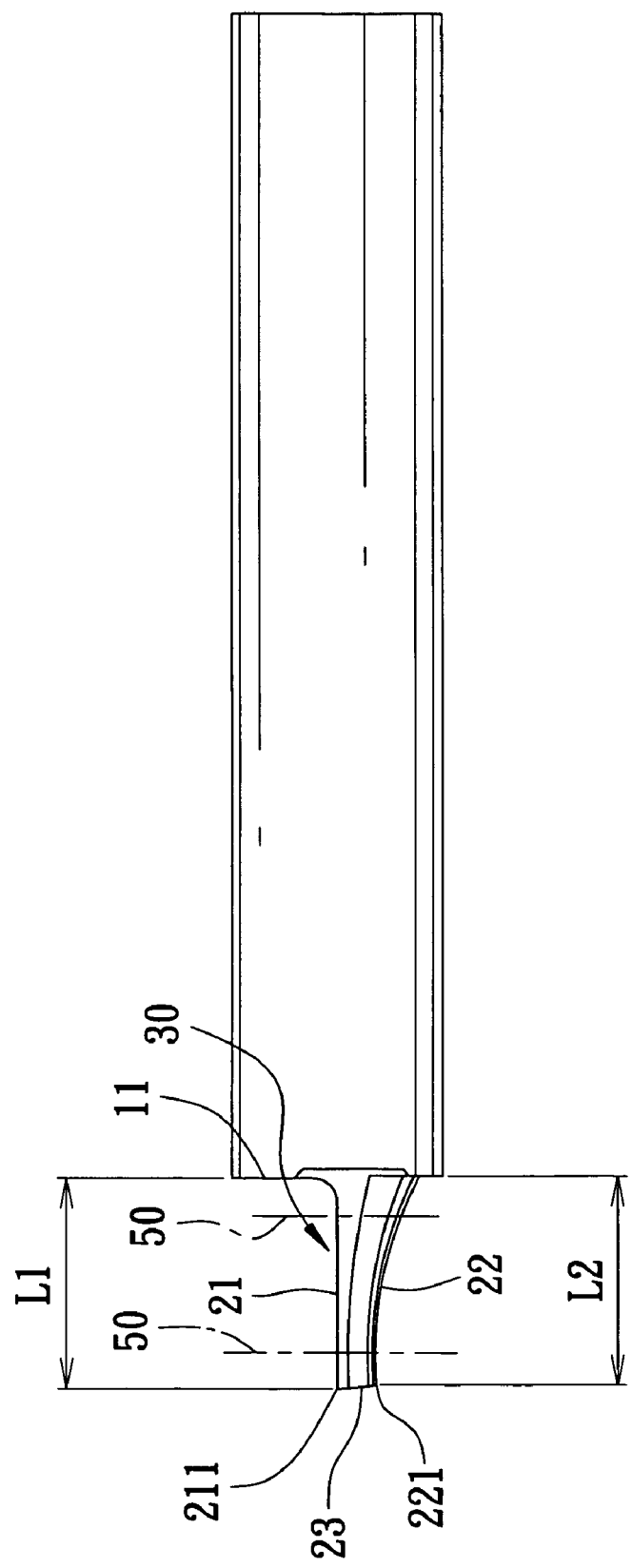
FIG. 7 is a side view of the first preferred embodiment.
Figure 8:
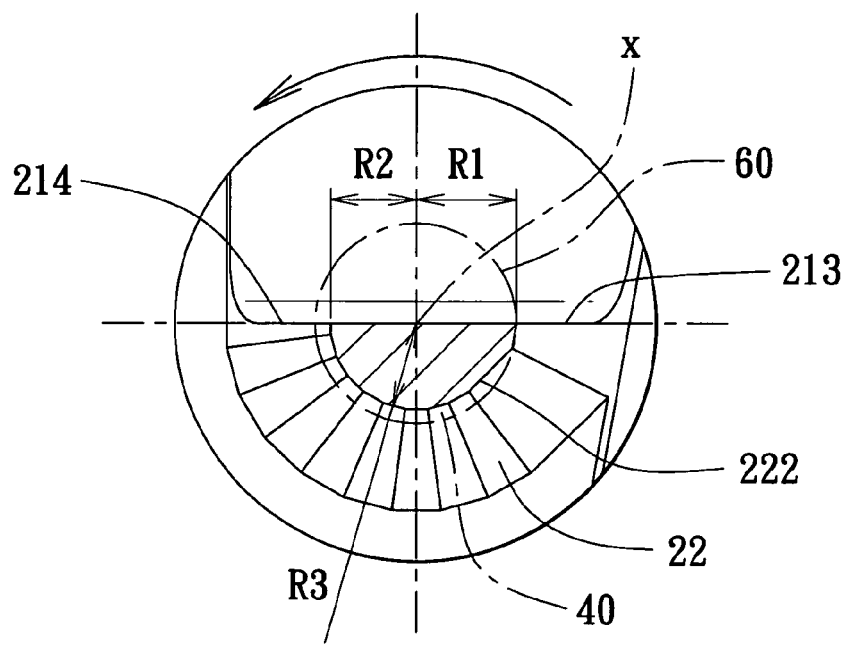
FIG. 8 is a sectional view taken along Line 8—8 in FIG. 6.
Figure 9:
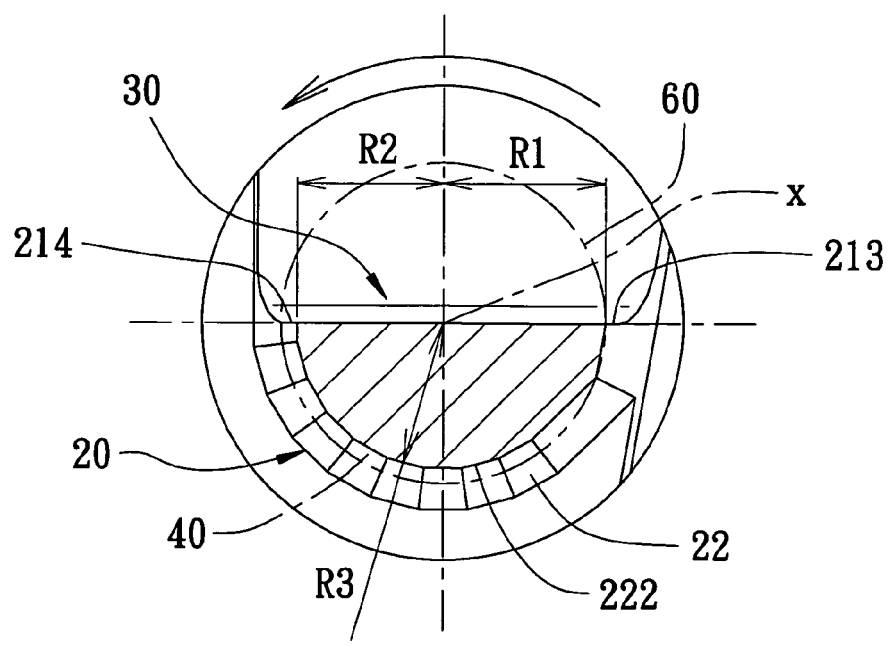
FIG. 9 is a sectional view taken along Line 9—9 in FIG. 6.

6 and 7) perpendicular to the axis (X), as shown in FIG. 6. Referring to FIG. 7, the distance (L1) between the front side 211 of the blade surface 21 and the first end surface 11 is larger than the distance (L2) between a front periphery 221 of the surrounding surface 22 and the first end surface 11. The front end surface 23 interconnects the front side 211 of the blade surface 21 and the front periphery 221 of the surrounding surface 22, and is inclined with respect to the reference planes 50. Therefore, referring to FIGS. 6 and 7, the front side 211 and the first lateral side 213 of the blade surface 21 define a blade tip 24 therebetween. The blade surface 21 and the first end surface 11 define cooperatively a chip-removing space 30 (see FIG. 4). The surrounding surface 22 is disposed around the axis (X), and extends from the first lateral side 213 to the second lateral side 214. The first lateral side 213 of the blade surface 21 serves as a cutting edge for forming the flanks 111 (see FIGS. 10 and 11). Any point of the first lateral side 213 of the blade surface 21 is spaced apart from the axis (X) by a first radial distance (R1). Any point of the second lateral side 214 of the blade surface 21 is spaced apart from the axis (X) by a second radial distance (R2), which is smaller than the corresponding first radial distance (R1). The first radial distance (R1) corresponding to the rear side 212 of the blade surface 21 is larger than that corresponding to the front side 211 of the blade surface 21. Referring to FIGS. 6, 8, and 9, the surrounding surface 22 and any of the planes 50, which intersect with the surrounding surface 22, define cooperatively a peripheral line 222 between the first and second lateral sides 213, 214 of the blade surface 21. Any point of the peripheral lines 222 is spaced apart from the axis (X) at a third radial distance (R3). Each of the third radial distances (R3) is smaller than the corresponding first radial distance (R1), and is equal to or larger than the corresponding second radial distance (R2). Referring to FIGS. 8 and 9, since each of the second and third radial distances (R2, R3) is smaller than the corresponding first radial distance (R1), when the first lateral side 213 rotates along a track 60, a chip passage space 40 is formed between the track 60 and the peripheral lines 222 so as to allow for passage of chips therethrough. This facilitates removal of the chips.

Figure 10:
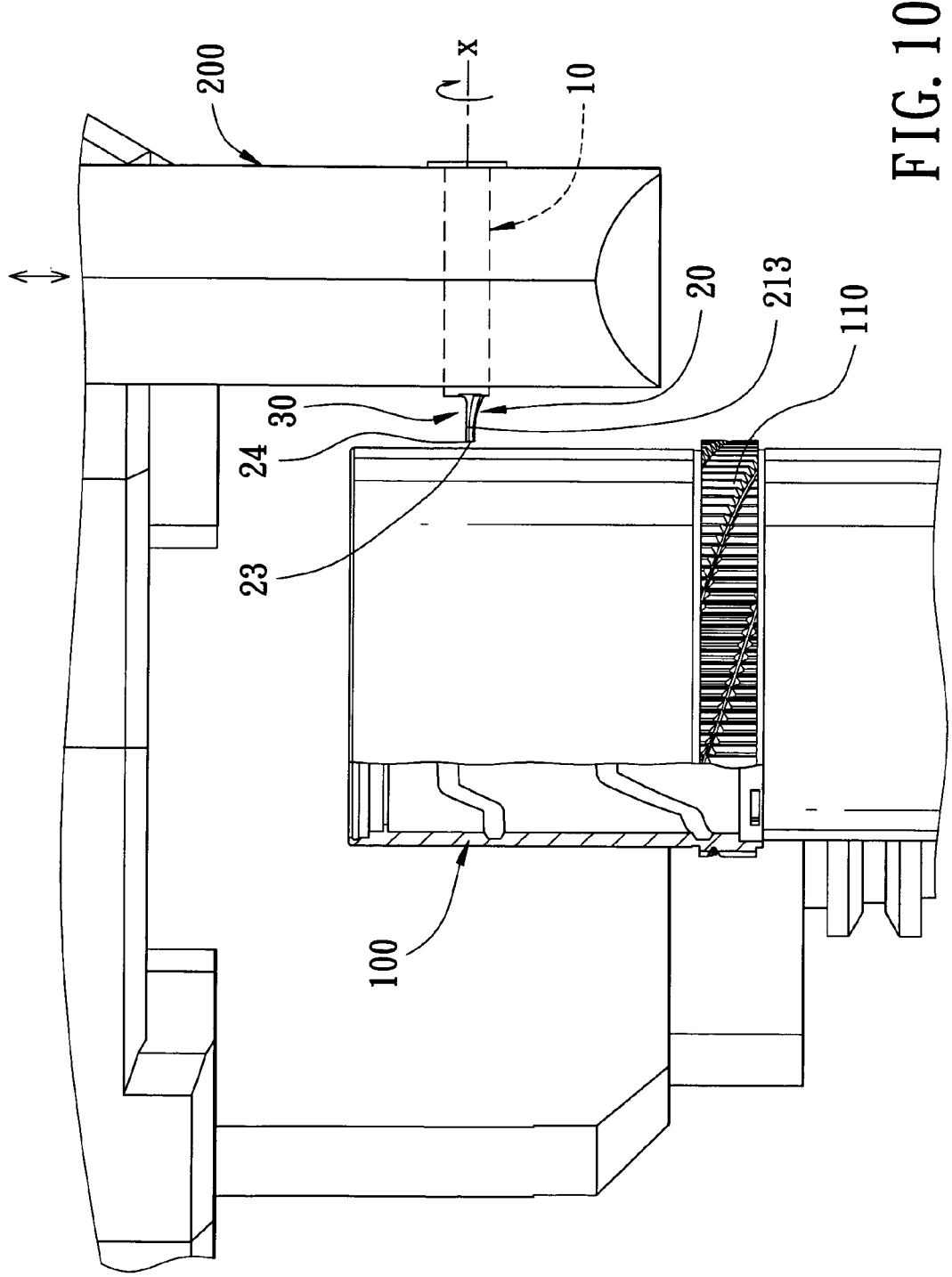
FIG. 10 is a schematic side view illustrating how a barrel of a camera lens is machined by the first preferred embodiment.
Figure 11:
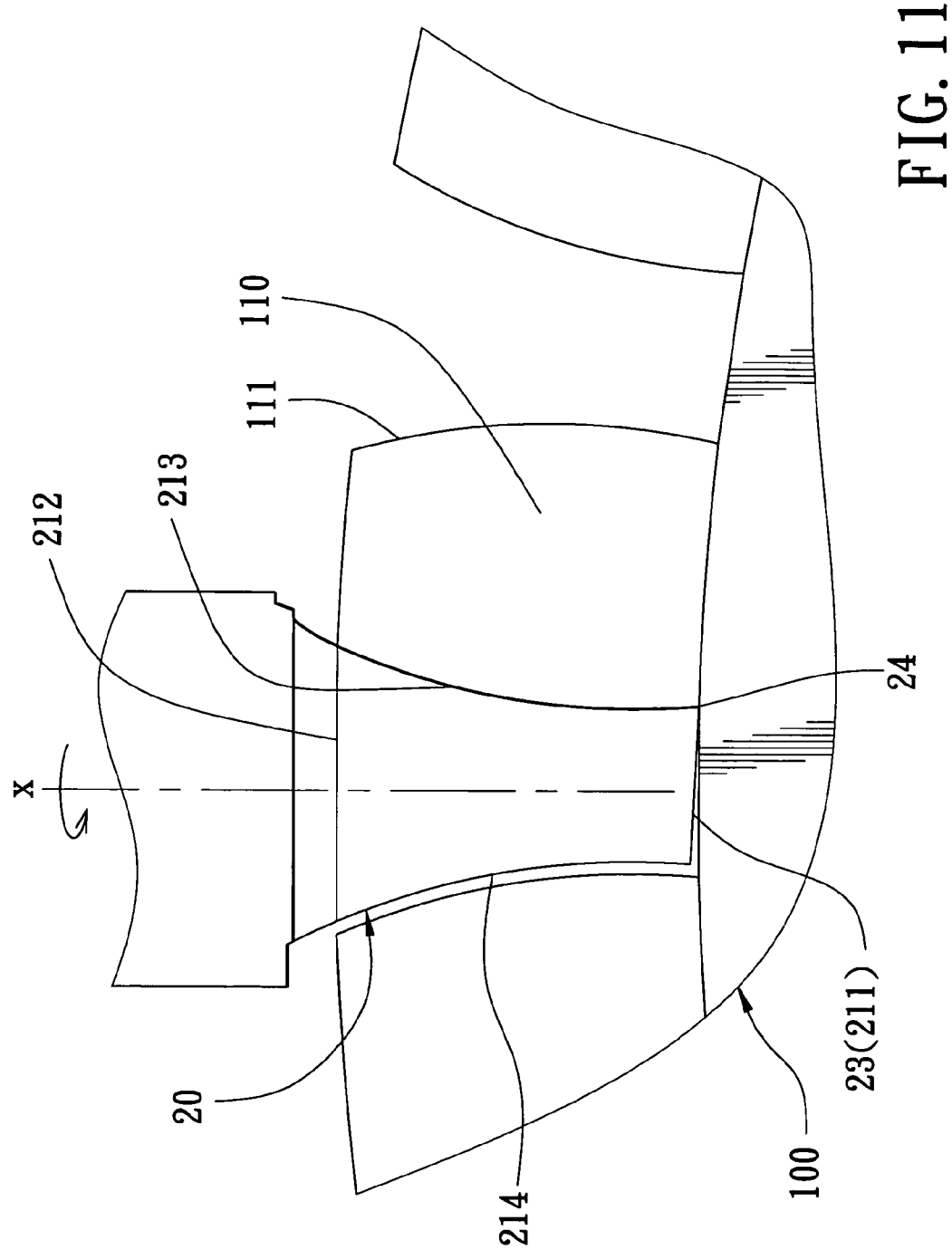
FIG. 11 is a schematic top view illustrating how the barrel is machined by the first preferred embodiment.

Referring to FIGS. 9, 10, and 11, in use, the spindle 10 is initially mounted to the main shaft 200. When the spindle 10 is moved toward the gear blank 100, the blade tip 24 first comes into press contact with an outer surface of the gear blank 100. This results in a point contact between the gear-forming cutter and the gear blank 100, rather than a surface contact between the same. Thus, static friction between the gear-forming cutter and the gear blank 100 is reduced so as to increase the cutting efficiency. When the blade portion 20 is rotated about the axis (X), the cutting edge digs into the gear blank 100. Hence, the gear teeth 110 are formed on the gear blank 100. In the gear teeth-forming process, chips are removed from the gear blank 100 through the chip-removing space 30 and the chip passage space 40.

Figure 2:
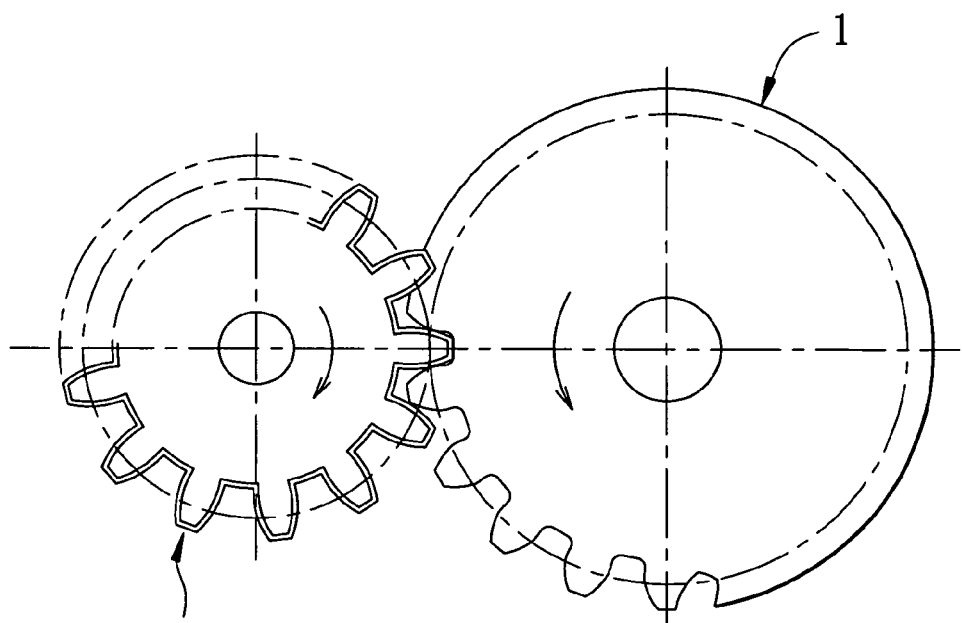
FIG. 2 illustrates how gear teeth are formed on a metallic blank by means of another conventional gear-forming cutter during a milling process.
Figure 3:
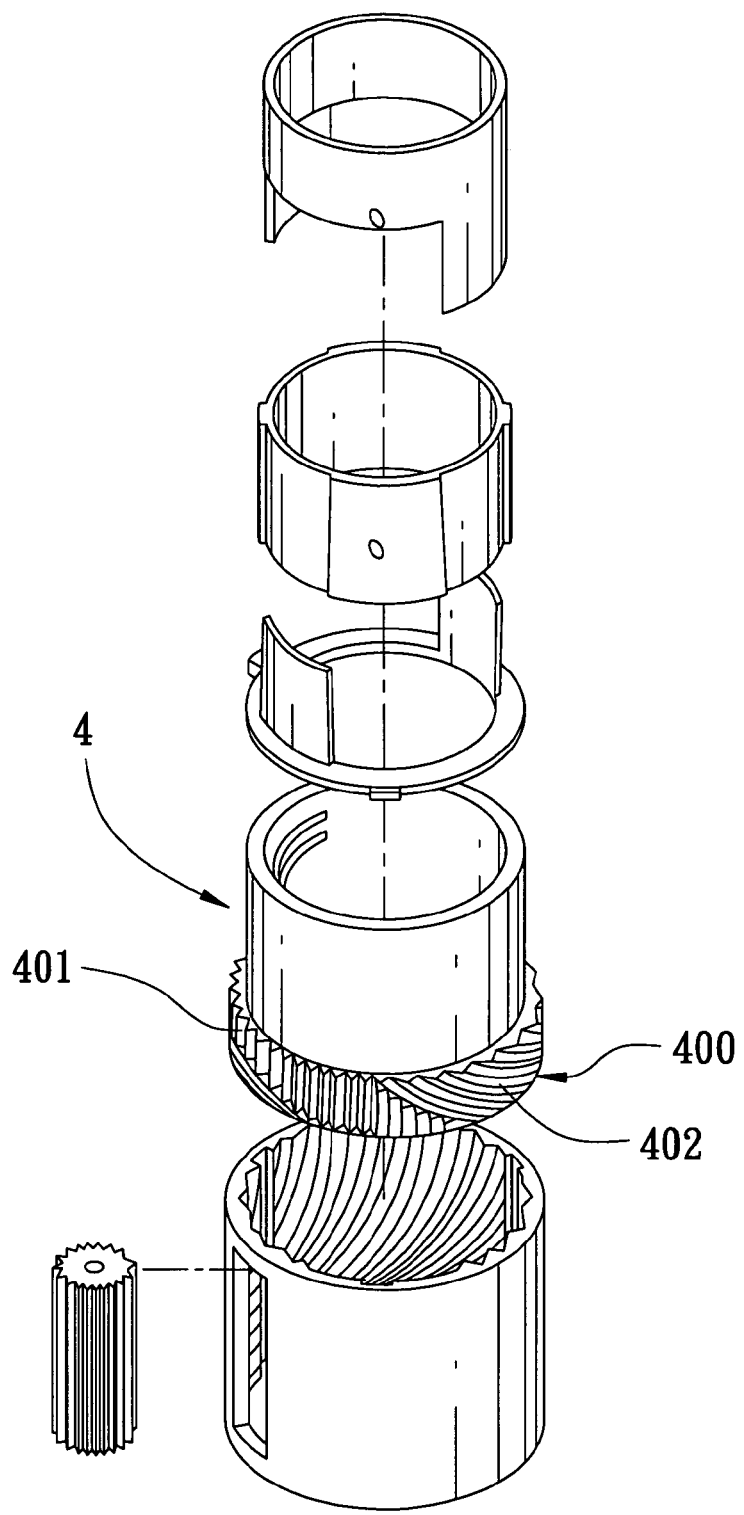
FIG. 3 is an exploded perspective view of a zoom lens of a camera.

From the foregoing, some of the advantages of the gear-forming cutter according to this invention can be summarized as follows:

(1) Unlike the prior art cutters 2, 3 (see FIGS. 1 and 2), each feed of the gear-forming cutter of this invention results in the formation of only one tooth space in the gear blank 100. Therefore, the gear-forming cutter of this invention is suitable for machining a non-metallic precision instrument. Furthermore, when the gear-forming cutter rotates about the axis (X) and the gear blank 100 rotates about an axis (not shown) perpendicular to the axis (X) to perform a gear teeth-forming operation, the main shaft 200 can be moved vertically so as to allow for formation of helical teeth on the gear blank 100.

(2) When the gear-forming cutter is fed, the blade tip 24 first contacts the gear blank 100. Thus, static friction between the blade portion 20 and the gear blank 100 is reduced.

(3) Even though the size of the tooth spaces to be formed in the gear blank 100 is small, chips can nevertheless be removed effectively through the chip-removing space 30 and the chip passage space 40.

Figure 12:
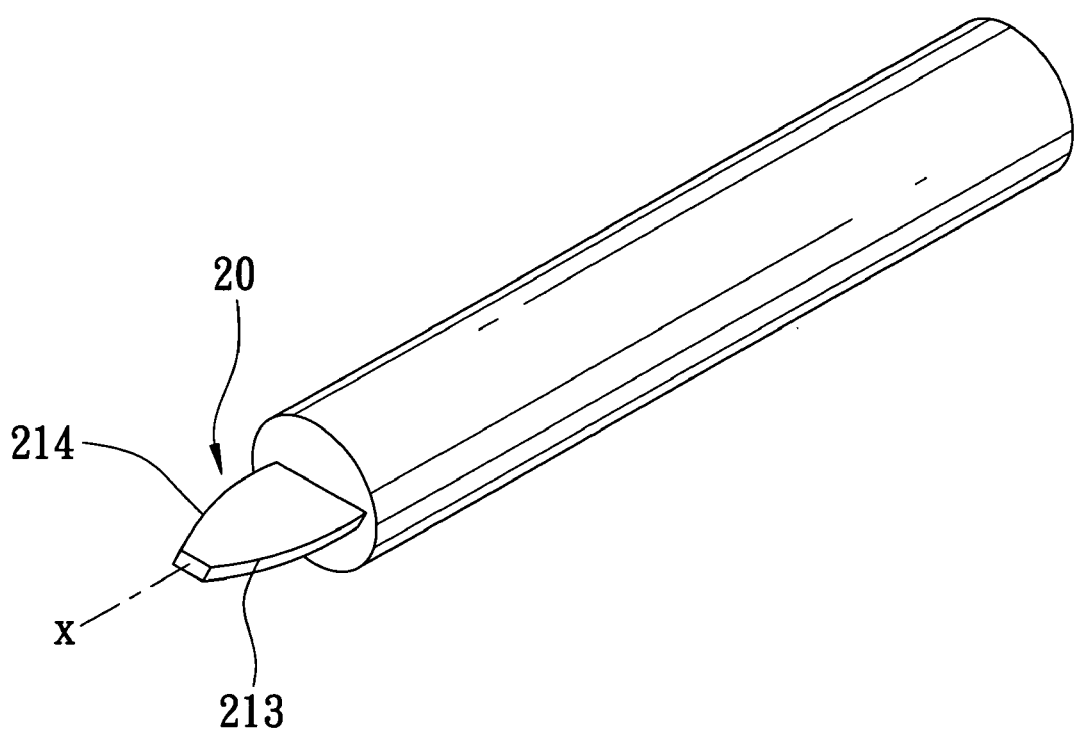
FIG. 12 is a perspective view of the second preferred embodiment of a gear-forming cutter according to this invention.

FIG. 12 shows the second preferred embodiment of a gear-forming cutter according to this invention, which is different from the previous embodiment in that the blade portion 20 is shaped as a plate. The first and second lateral sides 213, 214 of the blade surface 20 are convex-shaped.

In view of the above, the gear-forming cutter of this invention is small, and is suitable for machining a non-metallic precision instrument. Furthermore, chips can be removed effectively during machining operation. Thus, the object of this invention can be achieved.

With this invention thus explained, it is apparent that numerous modifications and variations can be made without departing from the scope and spirit of this invention. It is therefore intended that this invention be limited only as indicated by the appended claims.

We claim:

1. A gear-forming cutter for forming at least one gear tooth on a gear blank, the gear tooth including two flanks having a non-linear contour, said gear-forming cutter comprising:

a spindle having a pair of first and second end surfaces that are opposite to each other along an axis of said spindle; and a blade portion extending from said first end surface of said spindle along said axis and including a blade surface, a surrounding surface and a front end surface, said blade surface having a front side, a rear side opposite to said front side and located on said first end surface of said spindle, and a pair of opposite first and second lateral sides interconnecting said front and rear sides, said first lateral side having a shape which is adapted to correspond to the contour of the flanks of the gear tooth, said surrounding surface being disposed around said axis and extending from said first lateral side to said second lateral side, any point of said first lateral side of said blade surface being spaced apart from said axis by a first radial distance, any point of said second lateral side of said blade surface being spaced apart from said axis by a second radial distance, which is smaller than a corresponding one of said first radial distances, said first radial distance corresponding to said rear side of said blade surface being larger than that corresponding to said front side of said blade surface.

2. The gear-forming cutter as claimed in claim 1, wherein said surrounding surface and any plane, which intersects with said surrounding surface and which is perpendicular to said axis, define cooperatively a peripheral line between said first and second lateral sides of said blade surface, any point of said peripheral line being spaced apart from said axis by a third radial distance, each of said third radial distances being smaller than a corresponding one of said first radial distances and being equal to or larger than a corresponding one of said second radial distances.

3. The gear-forming cutter as claimed in claim 2, wherein said surrounding surface has a front periphery, said front end surface interconnecting said front side of said blade surface and said front periphery of said surrounding surface and being inclined with respect to the planes.

4. The gear-forming cutter as claimed in claim 3, wherein said front side of said blade surface is inclined with respect to the planes, a distance between said front side of said blade surface and said first end surface being larger than a distance between said front periphery of said surrounding surface and said first end surface.

5. The gear-forming cutter as claimed in claim 1, wherein said first lateral side of said blade surface is shaped as an involute line.

* * * * *